(12) United States Patent
Richter

(10) Patent No.: US 7,503,047 B1
(45) Date of Patent: Mar. 10, 2009

(54) SYSTEM AND METHOD FOR ENHANCING THE SHARING OF APPLICATION LIBRARIES BETWEEN DIFFERENT JVM'S AND SYSTEMS WITH A DYNAMIC RELOCATION BASED ON USAGE PATTERNS

(75) Inventor: Christian Richter, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/099,355

(22) Filed: Apr. 8, 2008

(51) Int. Cl.
*G06F 9/46* (2006.01)
*G06F 9/44* (2006.01)
*G06F 15/177* (2006.01)
*G06F 7/00* (2006.01)
*G06F 12/00* (2006.01)

(52) U.S. Cl. .......... 718/105; 718/104; 717/166; 717/167; 717/164; 709/220; 707/10; 707/200

(58) Field of Classification Search ............ 718/1, 718/100, 101, 102, 103, 104, 105; 717/166, 717/167, 116, 164; 709/220; 707/10, 200
See application file for complete search history.

(56) References Cited

U.S. PATENT DOCUMENTS

| | | | |
|---|---|---|---|
| 5,832,274 A * | 11/1998 | Cutler et al. | 717/171 |
| 6,470,494 B1 * | 10/2002 | Chan et al. | 717/166 |
| 6,519,594 B1 | 2/2003 | Li | |
| 6,842,759 B2 | 1/2005 | Haggar et al. | |
| 6,985,937 B1 * | 1/2006 | Keshav et al. | 709/223 |
| 7,096,467 B2 | 8/2006 | Wallman et al. | |
| 7,107,592 B2 * | 9/2006 | Taylor et al. | 718/104 |
| 7,246,135 B2 | 7/2007 | Reid | |
| 7,406,484 B1 * | 7/2008 | Srinivasan et al. | 707/200 |
| 2003/0135658 A1 | 7/2003 | Haggar et al. | |
| 2004/0210583 A1 * | 10/2004 | Enko et al. | 707/10 |
| 2004/0261069 A1 * | 12/2004 | Verbeke et al. | 717/166 |
| 2005/0125456 A1 * | 6/2005 | Hara et al. | 707/200 |
| 2006/0059156 A1 | 3/2006 | Janes et al. | |
| 2007/0061798 A1 * | 3/2007 | Atsatt | 717/166 |
| 2007/0106716 A1 | 5/2007 | Corrie | |

OTHER PUBLICATIONS

Ben Corrie, Java technology, IBM style: Class sharing, www.ibm.com; Mar. 20, 2008, pp. 1-11; IBM.
Class Data Sharing, java.sun.com, Mar. 20, 2008, pp. 1-2.

* cited by examiner

*Primary Examiner*—Meng-Al T. An
*Assistant Examiner*—Abdullah Al Kawsar
(74) *Attorney, Agent, or Firm*—Suiter Swantz pc llo

(57) ABSTRACT

The present disclosure is a method for storing possible classes or class containers (Jars) based on usage patterns of JVMs. The classes may be stored in the memory area of the JVM that may use those most and is closest to the actual system for access. Distributed environments where memory is shared across all systems can access memory across all systems but access speed is only high close to the current system with a fast connection and bandwidth towards this memory area.

1 Claim, 4 Drawing Sheets

SYSTEM AND METHOD FOR ENHANCING THE SHARING OF APPLICATION LIBRARIES BETWEEN DIFFERENT JVM'S AND SYSTEMS WITH A DYNAMIC RELOCATION BASED ON USAGE PATTERNS

TECHNICAL FIELD

The present disclosure generally relates to the field of software system architecture, and more particularly to software framework for Java-oriented systems, such as enhancing the sharing of application libraries and relocation based upon usage patterns.

BACKGROUND

Class loading of a Java Virtual Machine (JVM) is usually slow and consumes large amounts of memory. When a second JVM is started, only parts of the classes are being reused. If classes or libraries are being shared between JVM's, the class or library is given to other JVM's via a reference to this a first JVM's memory address space. This can be slow and result in synchronization costs on large access rates specifically in massive distributed environments and supercomputers.

SUMMARY

The present disclosure is directed to a method for storing possible classes or class containers (Jars) based on usage patterns of JVMs. The classes may be stored in the memory area of the JVM that may use them most and is closest to the actual system for access. Distributed environments where memory is shared across all systems can access memory across all systems but access speed is only high close to the current system with a fast connection and bandwidth towards this memory area. This can be learned or determined based on statistics how often a class is accessed by a JVM or in a distributed environment, by a remote system. This enables the JVM with a maximum performance to gather the information and reference to classes as they are in a memory segment easily and fast accessible by this JVM or system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The present disclosure is directed to a method for storing possible classes or class containers (Jars) based on usage patterns of JVMs. The classes may be stored in the memory area of the JVM that may use them most and is closest to the actual system for access. Distributed environments where memory is shared across all systems can access memory across all systems but access speed is only high close to the current system with a fast connection and bandwidth towards this memory area. This can be learned or determined based on statistics how often a class is accessed by a JVM or in a distributed environment, by a remote system. This enables the JVM with a maximum performance to gather the information and reference to classes as they are in a memory segment easily and fast accessible by this JVM or system.

Figure 1:
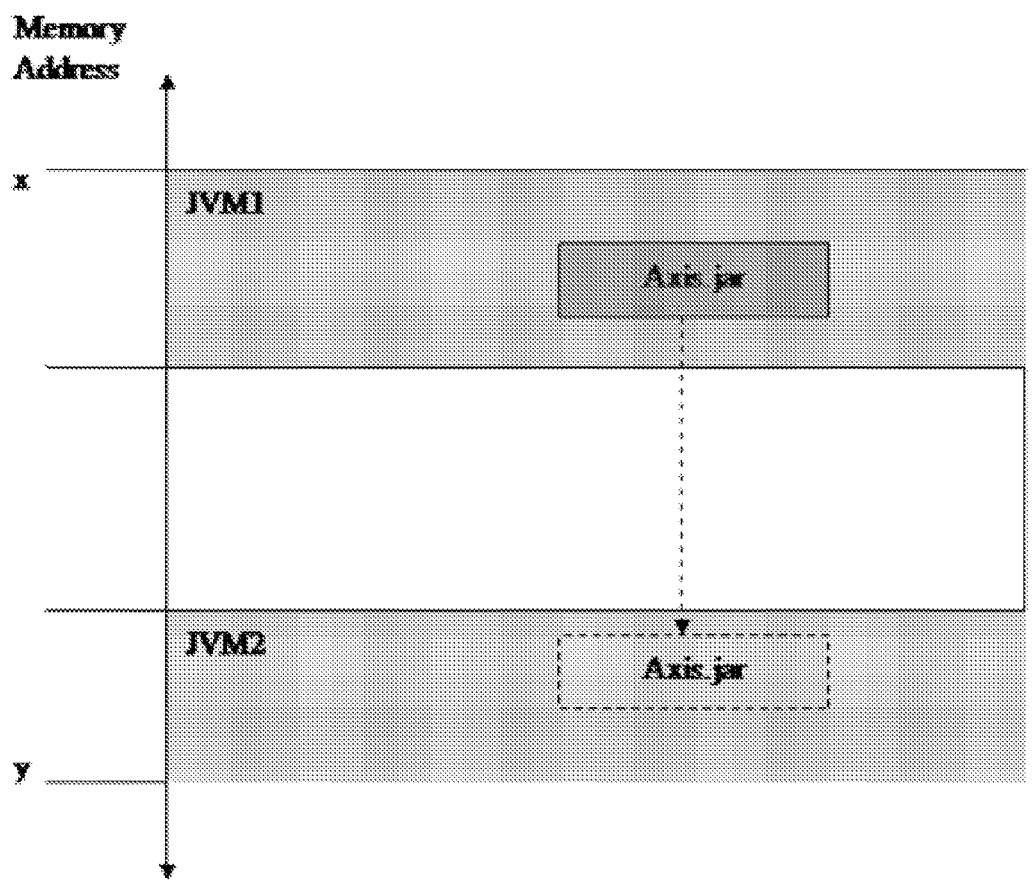
FIG. 1 is a flow diagram illustrating a method for relocating a class from JVM1 to JVM2 during runtime.

Referring to FIG. 1, a flow diagram illustrating a method for relocating a class from JVM1 to JVM2 during runtime is shown. Based on dynamic performance factors, such as high user load on specific times for AppServer JVM 1 for example, the class could be relocated in memory from AppServer JVM 2 to the JVM 1 in order to provide a maximum of performance to this JVM. References have to be counted to prevent loss of shared information on a JVM shutdown (still—there is the possibility of recreating the shared class if the system JVM halted unexpected).

A JVM (JVM1) is started on the system. This JVM is loading a library for web service interaction, axis.jar. Another JVM (JVM2) is started. Due to a higher load rate of axis.jar, this class is being relocated towards the memory area of JVM2 during runtime. FIG. 1 shows the move, based on a memory area.

Figure 2:
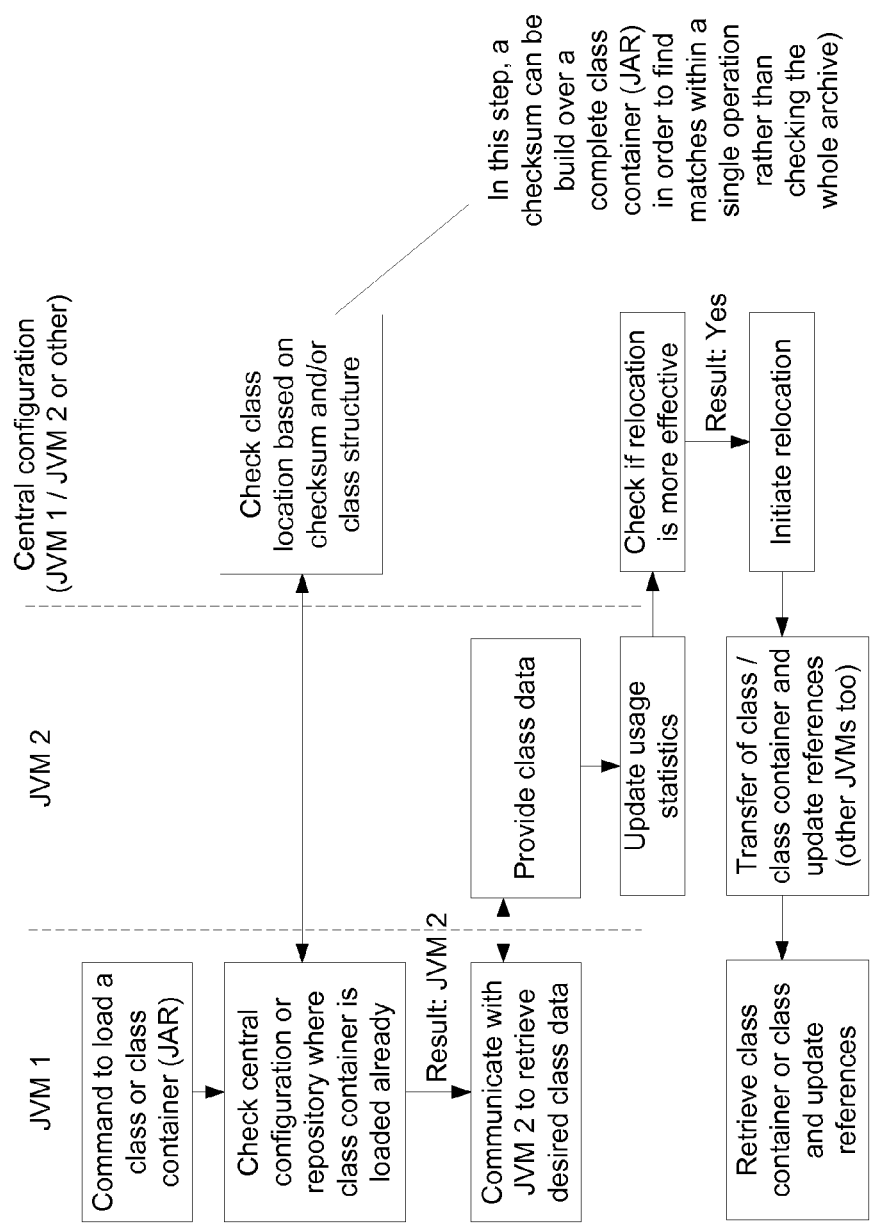
FIG. 2 is a flow diagram illustrating a method for storing possible classes or class containers (Jar's) based on usage patterns of JVMs.

Referring to FIG. 2, a flow diagram illustrating a method for storing possible classes or class containers (Jar's) based on usage patterns of JVMs is shown. Method for storing possible classes or class containers based upon usage patterns of JVMs may include the receipt of a command to load a class or class container. Next, determine a location of a central configuration or repository where the class or may be loaded. As part of a determination, a class location may be based on checksum and/or class structure. A checksum may refer to a build over a complete class container in order to find matches within a single operation rather the checking a whole archive. Next, communication is sent to the location where class container is located, for example, a second JVM. After reviewing updated usage statistics from the location, it may be determine to relocate the class container. Relocation may include transfer of the class container from a JVM to another JVM whereby the class container may be retrieved.

Figure 3:
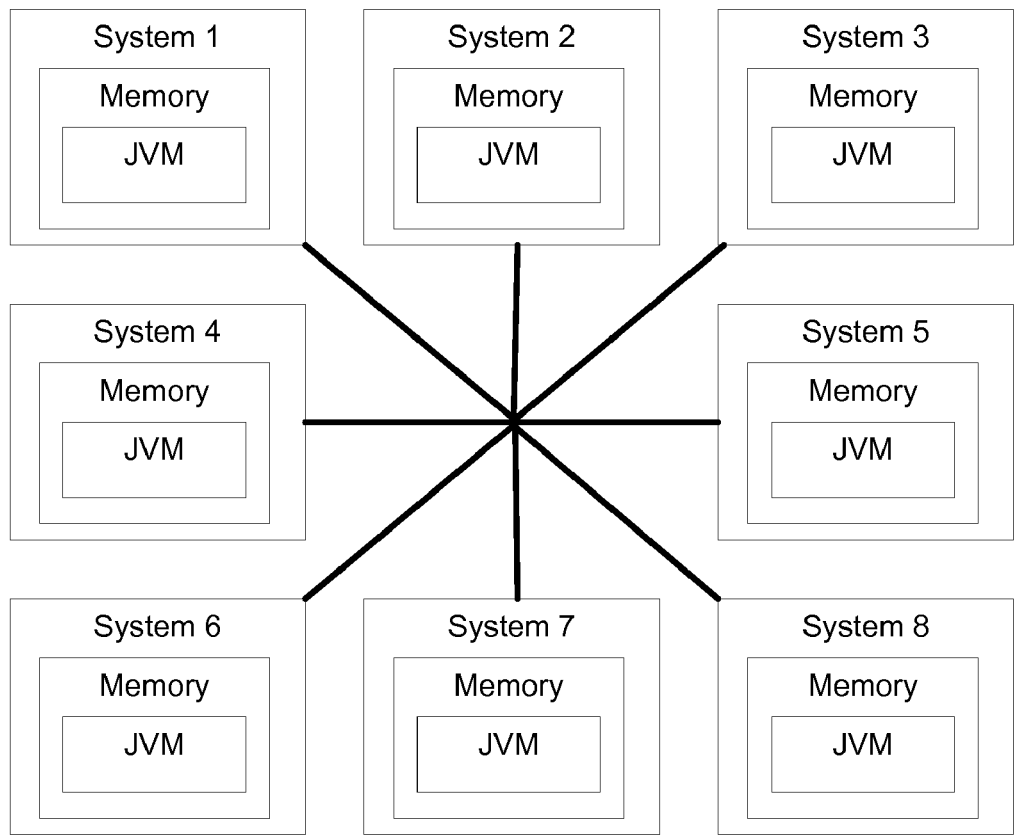
FIG. 3 is a block diagram illustrating a distributed environment.

Referring to FIG. 3, a block diagram illustrating a distributed environment is shown. Within this environment, memory is shared across systems and memory of a system is available to another system, and vice versa. This can be compared with distributed shared memory systems (DSM) where part of the memory is dedicated to the system and not shared (Operating system, device drivers etc.). The method a method for storing possible classes or class containers (Jar's) based on usage patterns of JVMs may ensure the classes or class containers may be located at the system that accesses them most. Or, in case many systems, access the same class or class libraries, the method would decide to load the class or class container twice as shown in flow diagram of FIG. 4.

Figure 4:
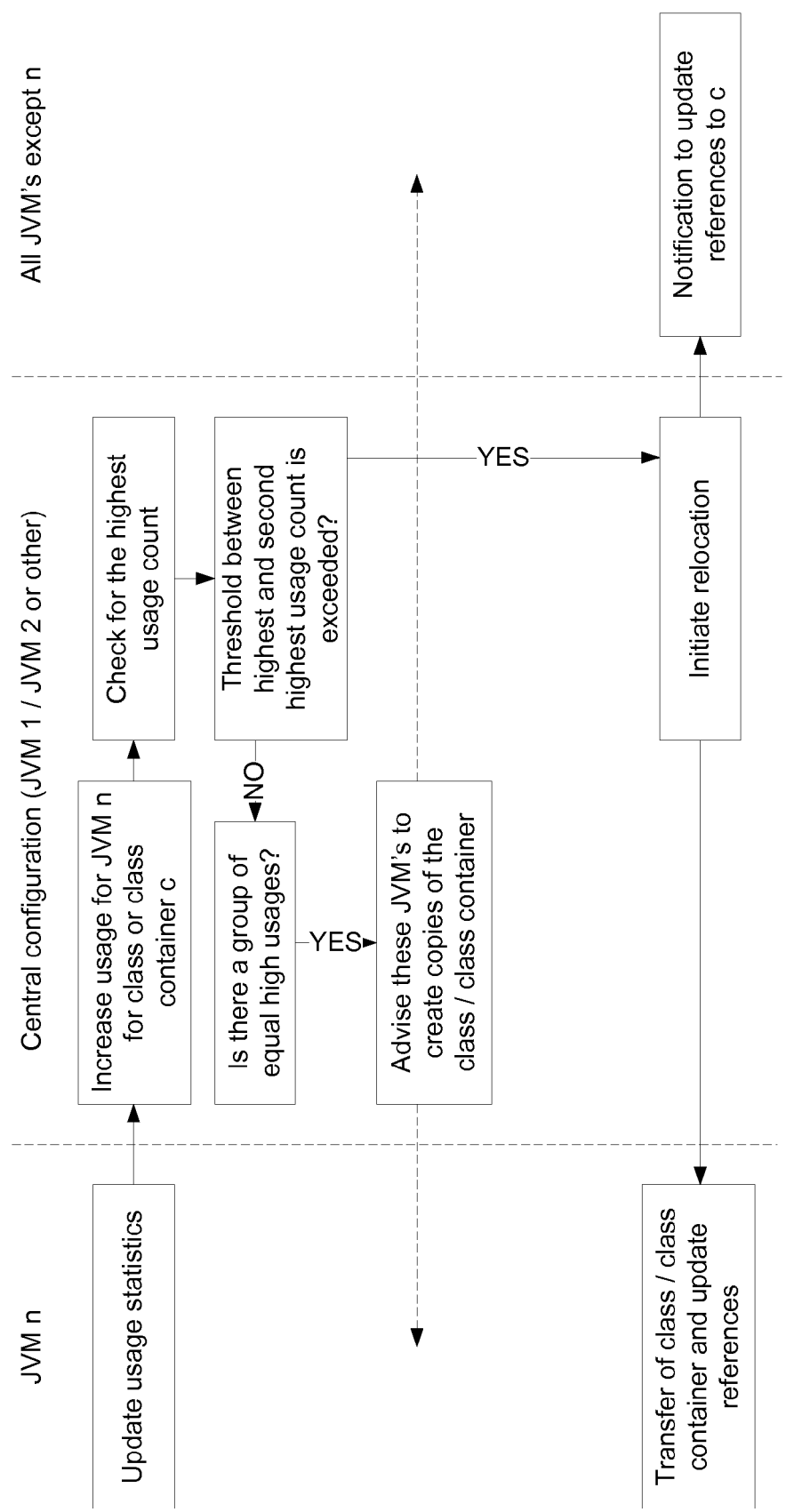
FIG. 4 is a flow diagram illustrating a method for determining a relocation.

Referring to FIG. 4, a flow diagram illustrating a method for determining a relocation is shown. Method for determining a relocation may include receipt of usage statistics from a first JVM. From the usage statistics, it may be determined if there is increased usage of a class container (c for example) by a first JVM. After checking for the highest usage count, it may be determined if a threshold between the highest usage count and the second highest usage count has been exceeded. If the threshold has been exceeded, a relocation may be initiated.

When a relocation is initiated, a notification is sent to update references to the class container and the class container is transferred to the first JVM.

If a threshold has not been exceeded, a determination is made to whether there is a group of approximately equal high usage. If such a condition exists, multiple JVMs may create copies of the class container for use on multiple JVMS.

It is contemplated that usage statistics may include information like instantiated classes from a specific class or class container; times of referring to classes of this class container (loading classes from this container). Based on the information exchanged with other JVM's, usage statistics may reflect states in a global manner whereby the data may show different JVMs and comparisons between different data sets. For example, a first JVM may access a particular class container 97 times where a second JVM accesses the same class container 19 times. This difference of 78 may be significant. A threshold of 75 may be specified whereby a relocation may be initiated once a difference of the threshold has been exceeded. Thus, the class container may be relocated to the first JVM. In another example, a percentage basis may be employed. For example, a threshold may be seventy-five percent (75%) whereby a relocation may be initiated when a JVM has exceeded a threshold percentage difference of accesses than another JVM. Usage statistics may also include a collection of read accesses as there may be metadata being accessed.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for storing a class container based on usage patterns, comprising:

receiving a request to load a class container at a first java virtual machine;

determining a location of said class container, the location of said class container being maintained by a configuration repository through a checksum operation that builds over a complete class container to find matches within a single operation and avoiding checking a whole archive;

communicating with another java virtual machine to retrieve said class container based upon location determined from said configuration repository;

determining if relocation of said class container is effective based upon usage statistics from said another java virtual machine, said usage statistics including a number of accesses of said class container;

transferring said class container from said another java virtual machine to said first java virtual machine when said usage statistics for access to the class container pass a threshold, said threshold representing at least one of number of accesses or percentage of accesses greater than a second java virtual machine;

providing said class container from said first java virtual machine;

updating references to location of said class container to reflect storage of said class container at said first java virtual machine with said configuration repository.

* * * * *